United States Patent
Fujishima et al.

(10) Patent No.: US 12,462,778 B2
(45) Date of Patent: Nov. 4, 2025

(54) SIGNAL PROCESSING DEVICE, SIGNAL PROCESSING SYSTEM, AND SIGNAL PROCESSING METHOD

(71) Applicant: Yamaha Corporation, Shizuoka (JP)

(72) Inventors: Takuya Fujishima, Shizuoka (JP); Akira Maezawa, Shizuoka (JP)

(73) Assignee: Yamaha Corporation, Hamamatsu (JP)

( * ) Notice: Subject to any disclaimer, the term of this patent is extended or adjusted under 35 U.S.C. 154(b) by 266 days.

(21) Appl. No.: 18/311,822

(22) Filed: May 3, 2023

(65) Prior Publication Data

US 2023/0274722 A1    Aug. 31, 2023

Related U.S. Application Data

(63) Continuation of application No. PCT/JP2020/041883, filed on Nov. 10, 2020.

(51) Int. Cl.
G10G 7/00 (2006.01)
G10H 1/00 (2006.01)

(52) U.S. Cl.
CPC ............ *G10G 7/00* (2013.01); *G10H 1/0008* (2013.01); *G10H 2210/076* (2013.01); *G10H 2220/005* (2013.01)

(58) Field of Classification Search
CPC .. G10G 7/00; G10H 1/0008; G10H 2210/076; G10H 2220/005
See application file for complete search history.

(56) References Cited

U.S. PATENT DOCUMENTS

| 7,534,951 B2* | 5/2009 | Yamashita | G10H 1/368 84/611 |
| 2023/0274722 A1* | 8/2023 | Fujishima | G10G 7/00 84/453 |
| 2025/0014554 A1* | 1/2025 | Ishikawa | G10H 1/361 |

FOREIGN PATENT DOCUMENTS

| JP | H06-110476 A | 4/1994 |
| JP | 2001-134273 A | 5/2001 |

(Continued)

OTHER PUBLICATIONS

First review of the PCT application at the level of the country in the corresponding Chinese Patent Application No. 202080105789.0, dated Aug. 20, 2024.

(Continued)

*Primary Examiner* — Robert W Horn
(74) *Attorney, Agent, or Firm* — Global IP Counselors, LLP

(57) ABSTRACT

A signal processing device includes an electronic controller including at least one processor. The electronic controller is configured to execute a reception unit, a generation unit, and a processing unit. The reception unit is configured to receive first time-series data that include sound data, and second time-series data that are generated based on the first time-series data and that include at least data indicating a timing of a human action. The generation unit is configured to generate, based on the second time-series data, third time-series data notifying of the timing of the human action. The processing unit is configured to synchronize and output an output signal based on the first time-series data and an output signal based on the third time-series data, such that the timing of the human action for the first time-series data and the timing of the human action for the third time-series data match.

8 Claims, 5 Drawing Sheets

(56) References Cited

FOREIGN PATENT DOCUMENTS

| JP | 2001-175257 A | | 6/2001 | | |
|---|---|---|---|---|---|
| JP | 2004-145221 A | | 5/2004 | | |
| JP | 2008158546 A | * | 7/2008 | ............... | G10H 1/00 |

OTHER PUBLICATIONS

Notice of Reasons for Refusal in the corresponding Japanese Patent Application No. 2022-561714, dated May 1, 2024.
International Search Report in PCT/JP2020/041883, dated Dec. 15, 2020.
Notice of Reasons for Refusal in the corresponding Japanese Patent Application No. 2024-140863, dated Jun. 27, 2025.

* cited by examiner

SIGNAL PROCESSING DEVICE, SIGNAL PROCESSING SYSTEM, AND SIGNAL PROCESSING METHOD

CROSS-REFERENCE TO RELATED APPLICATIONS

This application is a continuation application of International Application No. PCT/JP2020/041883, filed on Nov. 10, 2020. The entire disclosure of International Application No. PCT/JP2020/041883 is hereby incorporated herein by reference.

BACKGROUND

Technological Field

This disclosure relates to a signal processing device, a signal processing system, and a signal processing method.

Background Information

In accordance with time-series data such as performance data, a user may perform actions such as playing a musical instrument as part of an ensemble performance. Also, technologies for efficiently taking part in such ensemble performances are known (for example, refer to Patent Document 1: Japanese Laid-Open Patent Application No. 2004-145221).

SUMMARY

However, when an instrument is played as part of an ensemble performance, in accordance with time-series data, such as performance data, it is sometimes difficult to carry out actions such as performing at the appropriate timing without knowing the timings of actions such as the start timing of the performance.

For the purpose of solving the problem described above, an object of this disclosure is to provide a signal processing device, a signal processing system, and a signal processing method that allow the user to perform actions appropriately in accordance with the desired timings.

In order to solve the above-described problem, one aspect of this disclosure is a signal processing device comprising an electronic controller that includes at least one processor. The electronic controller is configured to execute a reception unit, a generation unit, and a processing unit. The reception unit is configured to receive first time-series data that include sound data, and second time-series data that are generated based on the first time-series data and that include at least data indicating a timing of a human action for the first time-series data. The generation unit is configured to generate, based on the second time-series data, third time-series data notifying of the timing of the human action. The processing unit is configured to synchronize and output an output signal based on the first time-series data and an output signal based on the third time-series data, such that the timing of the human action for the first time-series data and the timing of the human action for the third time-series data match.

DETAILED DESCRIPTION OF THE EMBODIMENTS

Selected embodiments will now be explained with reference to the drawings. It will be apparent to those skilled in the field from this disclosure that the following descriptions of the embodiments are provided for illustration only and not for the purpose of limiting the invention as defined by the appended claims and their equivalents.

A signal processing system, a signal processing device, and a signal processing method according to first embodiment of this disclosure will be described below with reference to the drawings.

First Embodiment

Figure 1:
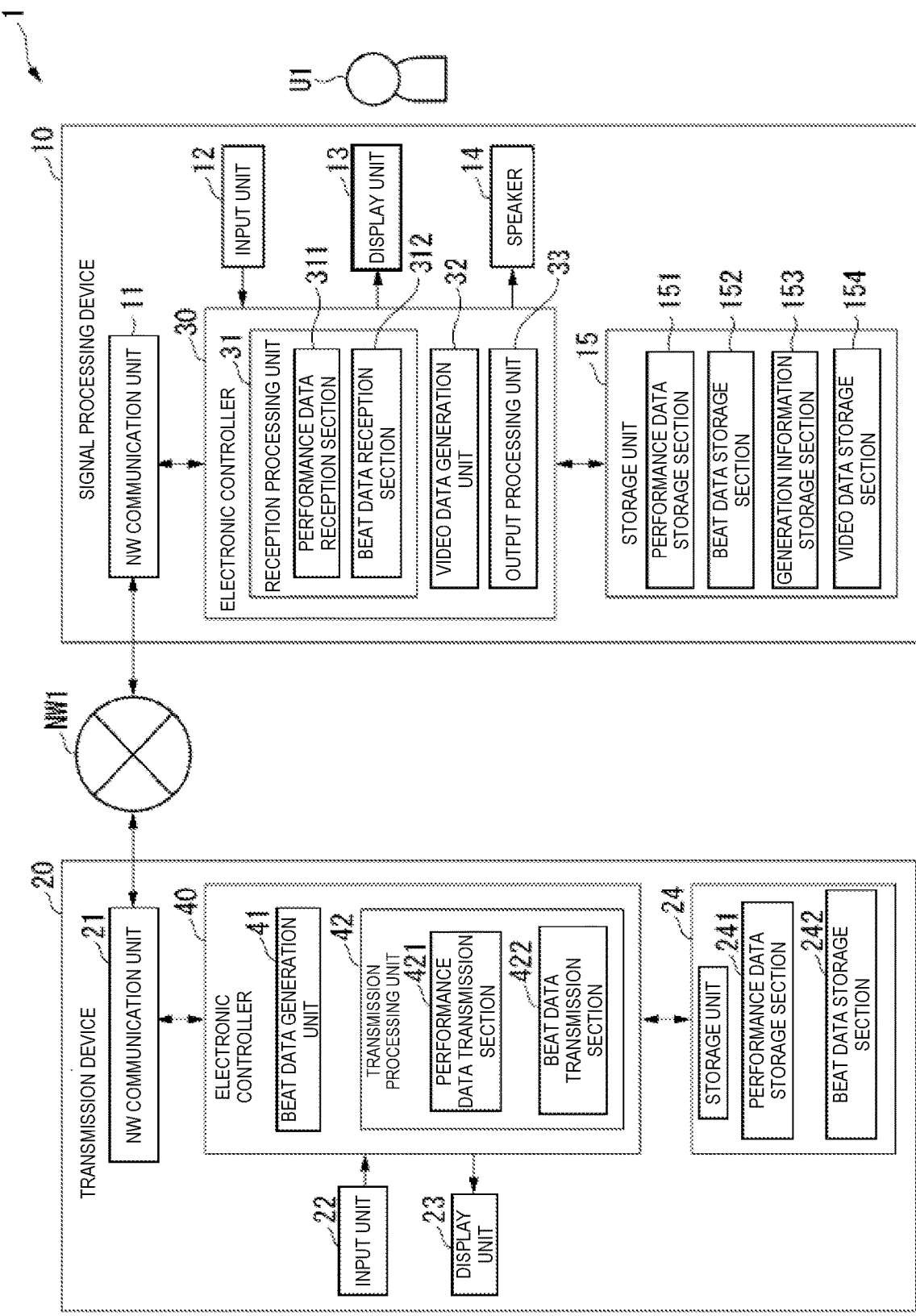
FIG. 1 is a block diagram showing one example of a signal processing system according to a first embodiment.

FIG. 1 is a block diagram showing a signal processing system 1 according to the present embodiment. The signal processing system 1 includes a signal processing device 10 and a transmission device 20. The signal processing device 10 and the transmission device 20 can be connected via a network NW1.

The transmission device 20 generates, based on first time-series data that include sound data, second time-series data that include at least data indicating at least one or more timings of human actions (human action timing(s), action timing(s)), and transmits the first time-series data and the second time-series data. The first time-series data are, for example, performance data of a musical performance, video data of gymnastics or dance, or the like. In the present embodiment, a case in which the first time-series data are performance data will be described.

Further, the second time-series data are data generated based on the first time-series data. The second time-series data are, for example, beat data that include one or more beats, in particular, time information of beat points of the performance data, and are time-series data with a smaller amount of data than the first time-series data. In the present embodiment, a case in which the second time-series data are beat data will be described.

Further, the timing of human action indicates a timing at which a user U1 performs an action (an action such as playing a musical instrument, singing a song, etc.), in accordance with an output signal based on the first time-series data (for example, a sound signal of a performance based on the performance data). The timing of action includes, for example, one or more performance (action) start timings (start timing of the entire performance, start timing of a solo part, and/or the like), an end timing of the performance, and/or the like.

The transmission device 20 includes an NW (network) communication unit 21, an input unit 22, a display unit 23, a storage unit 24, and an electronic controller (control unit) 40.

The NW communication unit 21 is an interface (interface unit) that can connect to the network NW1 and that carries out communication with the signal processing device 10 via the network NW1. The interface as used herein is a hardware interface configured to communicate with the signal processing device 10 via a wire or wireless connection with the network NW1.

The input unit 22 is an input device (user operable input), such as a keyboard, a mouse, or a touch panel, and receives various inputs from a user. The input unit 22 is used for various operations when the transmission device 20 is used, such as selecting and specifying the performance data.

The display unit 23 is, for example, a display such as a liquid-crystal display, and displays video of the performance data, beat data, images of various operation screens, and the like.

The storage unit (computer memory) 24 stores various information used by the transmission device 20. The storage unit 24 is any computer storage device or any non-transitory computer-readable medium with the sole exception of a transitory, propagating signal. For example, the storage unit 24 can include nonvolatile memory and volatile memory, and can include a ROM (Read Only Memory) device, a RAM (Random Access Memory) device, a hard disk, a flash drive, etc. The storage unit 24 includes a performance data storage section 241 and a beat data storage section 242.

The performance data storage section 241 stores performance data, which serve as source data for generating beat data. The performance data are sound data, such as a performance of a musical instrument, singing voice, and/or the like.

The beat data storage section 242 stores beat data, which indicate the times of beat points of the performance data. The beat data are data corresponding to the performance data. The beat data can include data (instruction data) that indicate an intensity of an action (such as an intensity of the performance).

The electronic controller (first electronic controller) 40 includes at least one processor including such as a CPU (Central Processing Unit), for example, and controls the transmission device 20. Here, the term "electronic controller" as used herein refers to hardware, and does not include a human. The electronic controller 40 can include, instead of the CPU or in addition to the CPU, one or more types of processors, such as a GPU (Graphics Processing Unit), a DSP (Digital Signal Processor), an FPGA (Field Programmable Gate Array), an ASIC (Application Specific Integrated Circuit), and the like. The electronic controller 40 includes and executes a beat data generation unit 41 and a transmission processing unit 42.

The beat data generation unit (first generation unit) 41 generates beat data based on performance data. The beat data generation unit 41 causes the beat data storage section 242 to store the generated beat data. The beat data can also be compressed data generated based on the performance data.

The transmission processing unit 42 transmits performance data and beat data to the signal processing device 10. The transmission processing unit 42 transmits the performance data and the beat data to the signal processing device 10 via the NW communication unit 21 and the network NW1, for example. The transmission processing unit 42 includes a performance data transmission section 421 and a beat data transmission section 422.

The performance data transmission section 421 transmits the performance data to the signal processing device 10 via the NW communication unit 21.

The beat data transmission section 422 transmits the beat data to the signal processing device 10 via the NW communication unit 21.

The signal processing device 10 is a receiving device that can connect to the network NW1 and communicate with the transmission device 20. The signal processing device 10 receives the first time-series data and the second time-series data from the transmission device 20 via the network NW1. The signal processing device 10 generates third time-series data that notifies of the timing of action based on the second time-series data. The signal processing device 10 synchronizes and outputs an output signal based on the first time-series data and an output signal based on the third time-series data, such that the timing of action for the first time-series data and the timing of action for the third time-series data match. In the present embodiment, a case in which the third time-series data are video data will be described.

The signal processing device 10 receives the performance data and the beat data. The signal processing device 10 generates video data indicating an image of a conductor based on the beat data, and outputs the image of the conductor in accordance with a sound signal based on the performance data.

The signal processing device 10 includes an NW communication unit 11, an input unit 12, a display unit 13, a speaker 14, a storage unit 15, and an electronic controller (control unit) 30.

The NW communication unit 11 is an interface (interface unit) and has the same configuration and functions as the NW communication unit 21. The NW communication unit 11 carries out communication with the transmission device 20 via the network NW1. The interface as used herein is a hardware interface configured to communicate with the transmission device 20 via a wire or wireless connection with the network NW1.

The input unit (user operable input) 12 and the display unit (display) 13 have the same configurations and functions as the input unit 22 and the display unit 23. The input unit 12 is used for various operations when the signal processing device 10 is used, such as selecting and specifying various settings for generating video data of the conductor. Further, the display unit 13 displays, for example, video of the conductor, images of various operation screens, and the like.

The speaker 14 outputs various sound signals used by the signal processing device 10. The speaker 14 outputs, for example, sound signals based on the performance data.

The storage unit (computer memory) 15 stores various information used by the signal processing device 10. The storage unit 15 is any computer storage device or any non-transitory computer-readable medium with the sole exception of a transitory, propagating signal. For example, the storage unit 15 can include nonvolatile memory and volatile memory, and can include a ROM (Read Only Memory) device, a RAM (Random Access Memory) device, a hard disk, a flash drive, etc. The storage unit 15 includes a performance data storage section 151, a beat data storage section 152, a generation information storage section 153, and a video data storage section 154.

The performance data storage section 151 stores performance data received from the transmission device 20.

The beat data storage section 152 stores beat data received from the transmission device 20.

The generation information storage section 153 stores data used when the video data is generated. In order to generate video data representing images of the conductor, the generation information storage section 153 stores, for example, a learned model which is a learning result constructed in advance using machine learning, various setting information when generating the video data, and the like. The learned model is a model that outputs the third time-series data when the input is the second time-series data. In the present embodiment, the learned model is a model that outputs video data representing a video of the conductor when beat data are input.

The video data storage section 154 stores video data that indicate the timings of actions, such as a performance. Further, the video data of the conductor can include video of the conductor that was actually captured, or an illustration or computer-graphic animation. Further, the video data of the conductor can display baton and hand movements.

The electronic controller (second electronic controller) 30 includes at least one a processor such as a CPU, or the like, and controls the signal processing device 10. Here, the term "electronic controller" as used herein refers to hardware, and does not include a human. The electronic controller 30 includes, instead of the CPU or in addition to the CPU, one or more types of processors, such as a GPU (Graphics Processing Unit), a DSP (Digital Signal Processor), an FPGA (Field Programmable Gate Array), an ASIC (Application Specific Integrated Circuit), and the like. The electronic controller 30 includes and executes a reception processing unit 31, a video data generation unit 32, and an output processing unit 33.

The reception processing unit 31 is one example of a reception unit. The reception processing unit 31 receives the performance data and the beat data from the transmission device 20 via the network NW1 and the NW communication unit 11. The reception processing unit 31 includes a performance data reception section 311 and a beat data reception section 312.

The performance data reception section 311 receives the performance data transmitted from the transmission device 20 via the network NW1. The performance data reception section 311 causes the performance data storage section 151 to store the received performance data.

The beat data reception section 312 receives the beat data transmitted from the transmission device 20 via the network NW1. The beat data reception section 312 causes the beat data storage section 152 to store the received beat data.

Figure 2:
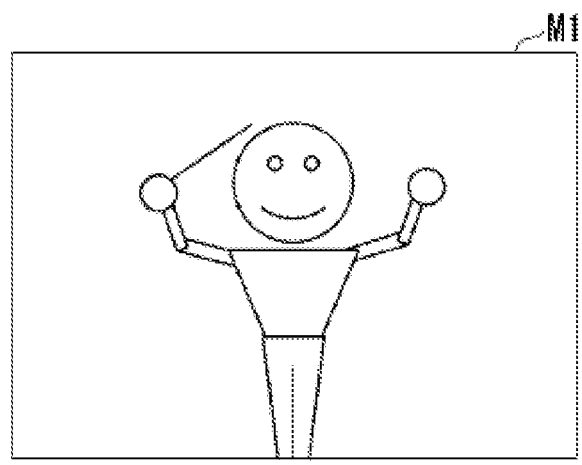
FIG. 2 is a diagram showing one example of video of a conductor.

The video data generation unit 32 is one example of a generation unit (second generation unit). The video data generation unit 32 generates video data of the conductor, which indicate the action timings based on the beat data. The video data generation unit 32 acquires the beat data stored in the beat data storage section 152 and generates the video data of the conductor, such as video M1 shown in FIG. 2, based on the acquired beat data and the data stored in the generation information storage section 153. For example, the video data generation unit 32 uses the learning model information stored in the generation information storage section 153 in order to generate video data of the conductor based on the beat data by machine learning.

If the beat data include data that indicate the intensity of an action (such as the intensity of the performance), the video data generation unit 32 generates video data of the conductor that include data indicating the intensity of the action.

The video data generation unit 32 causes the video data storage section 154 to store the generated video data of the conductor.

The output processing unit 33 is one example of a processing unit. The output processing unit 33 synchronizes and outputs a performance sound signal based on the performance data (output signal based on the first time-series data) and a video signal of the conductor based on the video data of the conductor (output signal based on the third time-series data), such that the action timing(s) in the performance data and the action timing(s) in the video data of the conductor match. The output processing unit 33 outputs the performance sound signal based on the performance data from the speaker 14, and outputs, in synchronization with the sound signal, the video signal of the conductor from the display unit 13 (refer to the video M1 of the conductor in FIG. 2).

An operation of the signal processing system 1 according to the present embodiment will now be described with reference to FIG. 3.

Figure 3:
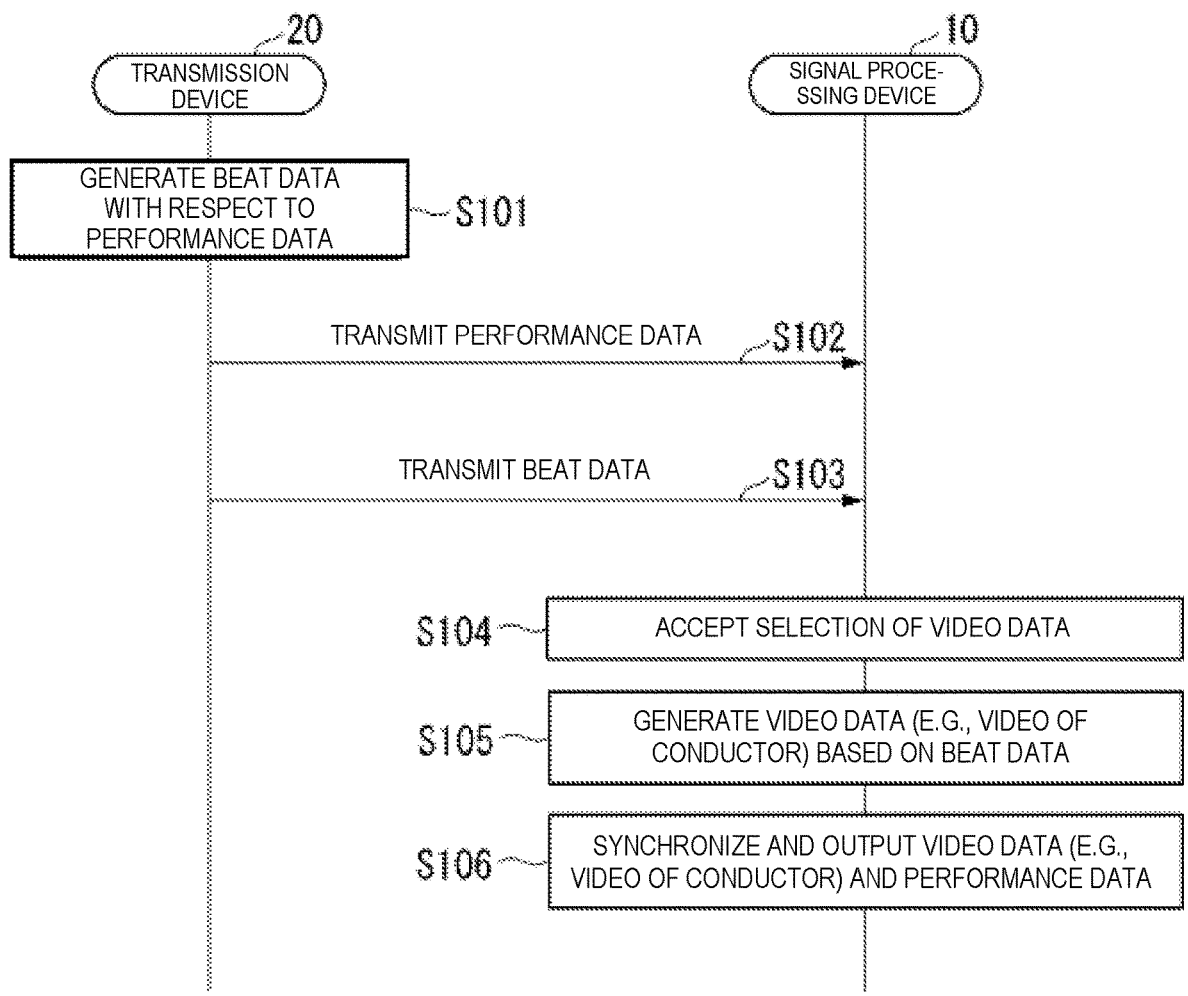
FIG. 3 is a diagram showing one example of an operation of a signal processing system according to the first embodiment.

FIG. 3 is a diagram showing one example of an operation of the signal processing system 1 according to the present embodiment.

First, the transmission device 20 generates beat data for the performance data (Step S101). The beat data generation unit 41 acquires the performance data specified by operation of the input unit 22 from the performance data storage section 241. The beat data generation unit 41 generates beat data that include time information of beat points based on the performance data. The beat data generation unit 41 causes the beat data storage section 242 to store the generated beat data.

The beat data generation unit 41 can display the performance data and the generated beat data on the display unit 23 or otherwise make the data observable to the user of the transmission device 20, so that the user can check the beat data and adjust or correct the beat data based on the user's instructions.

The transmission device 20 then transmits the performance data to the signal processing device 10 (Step S102). The performance data transmission section 421 transmits the performance data acquired from the performance data storage section 241 to the signal processing device 10. The performance data reception section 311 thus receives the performance data from the transmission device 20 and stores the received performance data in the performance data storage section 151.

The transmission device 20 then transmits the beat data to the signal processing device 10 (Step S103). The beat data transmission section 422 transmits the beat data to the signal processing device 10. The beat data reception section 312 thus receives the beat data from the transmission device 20 and stores the received beat data in the beat data storage section 152.

The signal processing device 10 then accepts a selection of the video data (Step S104). The video data generation unit 32 accepts a selection (specification of settings, or the like) of the video data by the user U1 via the input unit 12. The signal processing device 10 can accept, for example, specification of video data of the conductor corresponding only to the performance timing, specification of video data of the conductor including an instruction on the intensity of the action, etc.

The signal processing device 10 then generates, based on the beat data, video data representing an image of a conductor (Step S105). The video data generation unit 32 generates the video data, based on selection (specification of settings, etc.) of the video data by the user U1, from the beat data and a learned model that is the result of machine learning, stored in the generation information storage section 153. The video data generation unit 32 stores the generated video data in the video data storage section 154.

The signal processing device 10 then synchronizes and outputs the video data and the performance data (Step S106). The output processing unit 33 causes the sound signal based on the performance data to be output from the speaker 14. The output processing unit 33 also causes a video signal of the conductor based on the video data, such as video M1 in FIG. 2, to be output, from the display unit 13, in synchronization with the sound signal.

The user U1 performs actions, such as playing a musical instrument or singing a song, in accordance with the video of the conductor output by the signal processing device 10. This allows the user U1 to appropriately perform such actions as playing a musical instrument in accordance with the sound signal based on the performance data.

In the example shown in FIG. 3, the signal processing device 10 generates the video data representing the conductor corresponding to the beat data in Step S105 and outputs the video signal of the conductor based on the video data in Step S106. This can be realized in various ways. For example, the signal processing device 10 can carry out Step S106 once for the entire beat data. The signal processing device 10 can also realize the processes of steps S105 and S106 repeatedly.

As described above, the signal processing device 10 according to the present embodiment includes the reception processing unit 31, the video data generation unit 32, and the output processing unit 33. The reception processing unit 31 receives first time-series data that include sound data and second time-series data that are generated based on the first time-series data and that include at least data indicating human action timings. The video data generation unit 32 generates third time-series data indicating (notifying of) action timings based on the second time-series data. The output processing unit 33 synchronizes and outputs an output signal based on the first time-series data and an output signal based on the third time-series data, such that the action timings in the first time-series data and the action timings indicated by the third time-series data match.

As a result, in the signal processing device 10 according to the present embodiment, the output signal based on the third time-series data and the output signal based on the first time-series data are synchronized and output, so that the user U1 can appropriately recognize the action timings and perform actions in accordance with desired timings.

Further, since the signal processing device 10 according to the present embodiment receives the beat data from the transmission device 20 that have a smaller amount of data than the first time-series data, it is possible to reduce the amount of communication data and to reduce the delay in the output signal based on the third time-series data.

Further, in the present embodiment, the first time-series data are performance data, and the action timings include one or more action start timing. Further, the second time-series data are beat data that indicate one or more beats and include at least one or more action start timings. The video data generation unit 32 generates video data as the third time-series data based on the beat data. The output processing unit 33 outputs the video signal based on the video data in synchronization with the output signal based on the performance data.

As a result, in the signal processing device 10 according to the present embodiment, the user U1 can appropriately recognize the start timing of the performance, for example. Thus, the user U1 can appropriately play a musical instrument, sing a song, or the like, in time with the output signal based on the performance data.

Further, in the present embodiment, the video data of the third time-series data are video data of the conductor.

Since the conductor has the task of communicating various action timings, it is possible to use a video of the conductor to facilitate recognition of the action start timings. Thus, the user U1 can visually recognize the video signal based on the video data of the conductor to appropriately play an instrument, etc., in time with the performance data received from the transmission device 20.

Further, in the present embodiment, the video data generation unit 32 generates the video data of the conductor based on the beat data by machine learning.

As a result, the signal processing device 10 according to the present embodiment can easily create the video data of the conductor from the beat data.

Further, in the present embodiment, the reception processing unit 31 receives the second time-series data that have a smaller amount of data than the first time-series data. The video data generation unit 32 decodes the second time-series data to generate the third time-series data.

As a result, since the signal processing device 10 according to the present embodiment receives the second time-series data that have a smaller amount of data than the first time-series data, the amount of communication data becomes small, and the third time-series data are generated before the output of the first time-series data. Therefore, a signal based on the third time-series data can be output without delay in the output of the sound signal based on the first time-series data.

Further, in the present embodiment, the second time-series data include beat point data indicating one or more beats of the one or more actions (one or more timings of the one or more actions) and data indicating the intensity of each of the one or more actions. The video data generation unit 32 generates the third time-series data including the data indicating the intensity of each of the one or more actions.

As a result, in the signal processing device 10 according to the present embodiment, the user U1 can recognize the timing of the intensity of each action and more appropriately perform actions including the intensity of each action, in accordance with the first time-series data. That is, in the signal processing device 10 according to the present embodiment, the user U1 can perform, for example, highly expressive actions that include the intensity in accordance with the output of the performance data.

Further, the signal processing system 1 according to the present embodiment includes the signal processing device 10, and the transmission device 20 which generates the second time-series data including at least data indicating human action timings, based on first time-series data including data, and transmits the first time-series data and the second time-series data.

As a result, the signal processing system 1 according to the present embodiment exhibits the same effect as the signal processing device 10, and the user U1 is able to appropriately carry out actions in accordance with desired timings.

Second Embodiment

A signal processing system 1a, a signal processing device 10a, and a transmission device 20a according to the second embodiment will now be described with reference to the drawings.

Figure 4:
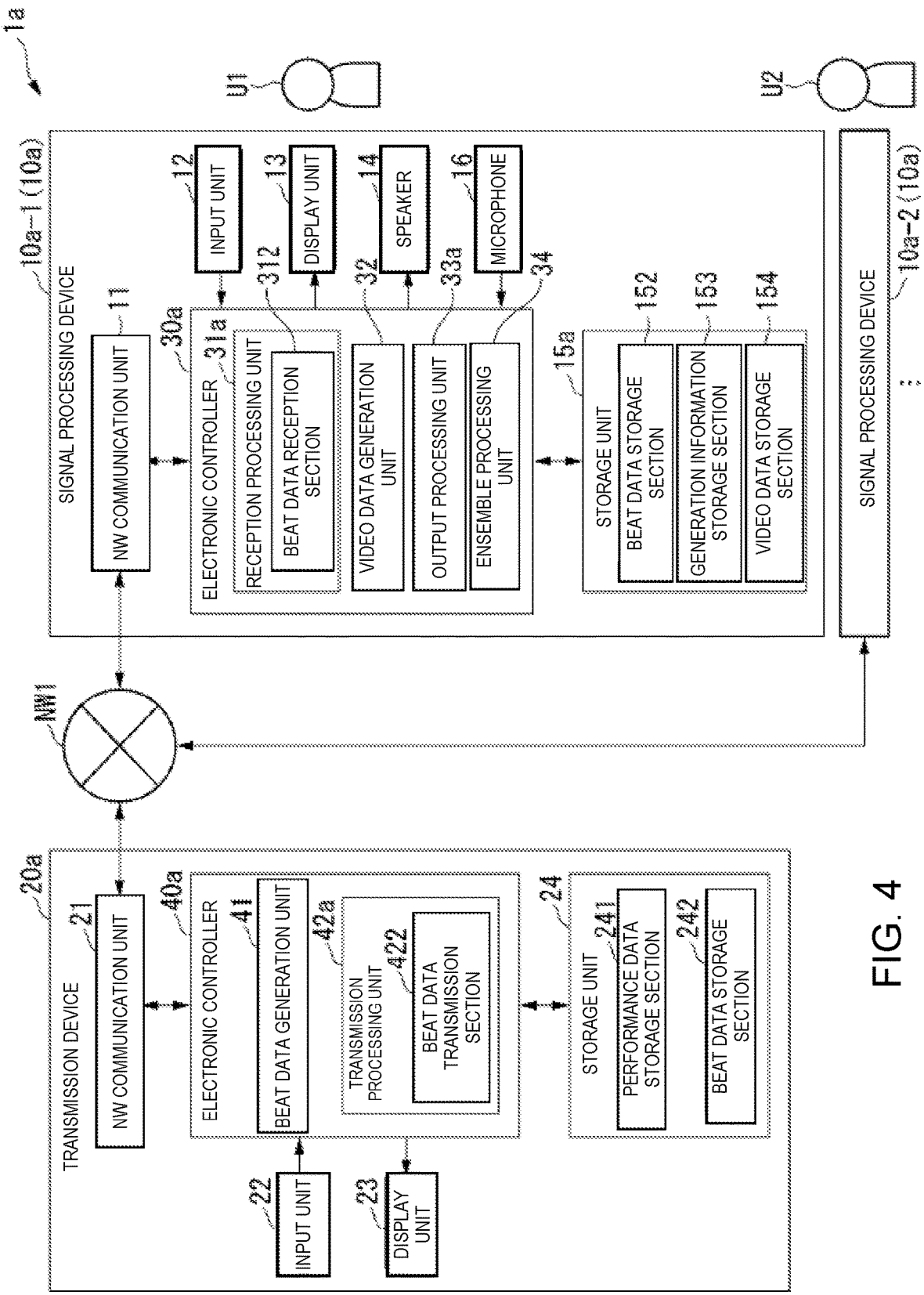
FIG. 4 is a block diagram showing one example of a signal processing system according to a second embodiment.

FIG. 4 is a block diagram showing one example of the signal processing system 1a according to the present embodiment.

The signal processing system 1a includes a plurality of signal processing devices 10a (10a-1, 10a-2, . . .) and a transmission device 20a. The plurality of signal processing devices 10a and the transmission device 20a can be connected via the network NW1.

In the present embodiment, an example of a case will be described in which the transmission device 20a transmits beat data to the plurality of signal processing devices 10a, and each of the plurality of signal processing devices 10a outputs a video of the conductor based on the beat data to carry out an ensemble performance among a plurality of users.

In FIG. 4, the configurations that are the same as those in FIG. 1 have been assigned the same reference numerals and their descriptions have been omitted. Further, in FIG. 4, each of the signal processing devices 10a-1, 10a-2, . . . , has the same configuration, and when no specific signal processing device provided in the signal processing system 1a is indicated, or when no particular distinction is made, the device will be described as signal processing device 10a.

The basic function of the transmission device 20a is the same as the transmission device 20, but it is different from the first embodiment in that performance data are not transmitted to the signal processing device 10a. In the present embodiment, it is assumed that the musical piece of the performance data is shared between the transmission device 20a and the signal processing device 10a.

The transmission device 20a includes the NW communication unit 21, the input unit 22, the display unit 23, the storage unit 24, and an electronic controller 40a.

The basic configuration and function of the electronic controller 40a are the same as those of the electronic controller 40. The electronic controller 40a includes and executes the beat data generation unit 41 and a transmission processing unit 42a.

The transmission processing unit 42a includes the beat data transmission section 422, but is different from the transmission processing unit 42 in not being equipped with the above-mentioned performance data transmission section 421. The transmission processing unit 42a transmits beat data, which are generated based on performance data on a performance in which a predetermined musical piece has been played, to the plurality of signal processing devices 10a.

The signal processing device 10a has the same basic functions as the signal processing device 10a, but differs in not receiving performance data from the transmission device 20a and in that a function for executing an ensemble performance among the plurality of signal processing devices 10a is added.

The signal processing device 10a includes the NW communication unit 11, the input unit 12, the display device 13, the speaker 14, a storage unit 15a, a microphone 16, and an electronic controller 30a.

In the present embodiment, a user U1 is a user of the signal processing device 10a-1, and a user U2 corresponds to a user of the signal processing device 10a-2.

The storage unit 15a includes the beat data storage section 152, the generation information storage section 153, and the video data storage section 154, but differs from the storage unit 15 in not being equipped with the performance data storage section 151.

The microphone 16 collects sounds in the vicinity of the signal processing device 10a and outputs the collected sound signal. At the time of an ensemble performance, the microphone 16 outputs a sound signal obtained by collecting the sound of the user's performance to the electronic controller 30a.

The basic configuration and functions of the electronic controller 30a are the same as those of the electronic controller 30. The electronic controller 30a includes and executes a reception processing unit 31a, the video data generation unit 32, an output processing unit 33a, and the ensemble processing unit 34.

The reception processing unit 31a includes the beat data reception section 312, but differs from the reception processing unit 31 in not being equipped with the above-mentioned performance data reception section 311.

The output processing unit 33a outputs a video signal based on a video data of the conductor, which are generated by the video data generation unit 32, such that the performance timings can be visually recognized.

The ensemble processing unit 34 receives a performance sound signal from another device (such as another signal processing device 10a) via the NW communication unit 11 and the network NW1 and causes the speaker 14 to output the received performance sound signal. Further, the ensemble processing unit 34 transmits the performance sound signal collected by the microphone 16 to another device (such as another signal processing device 10a) via the NW communication unit 11 and the network NW1.

An operation of the signal processing system 1a according to the present embodiment will now be described with reference to FIG. 5.

Figure 5:
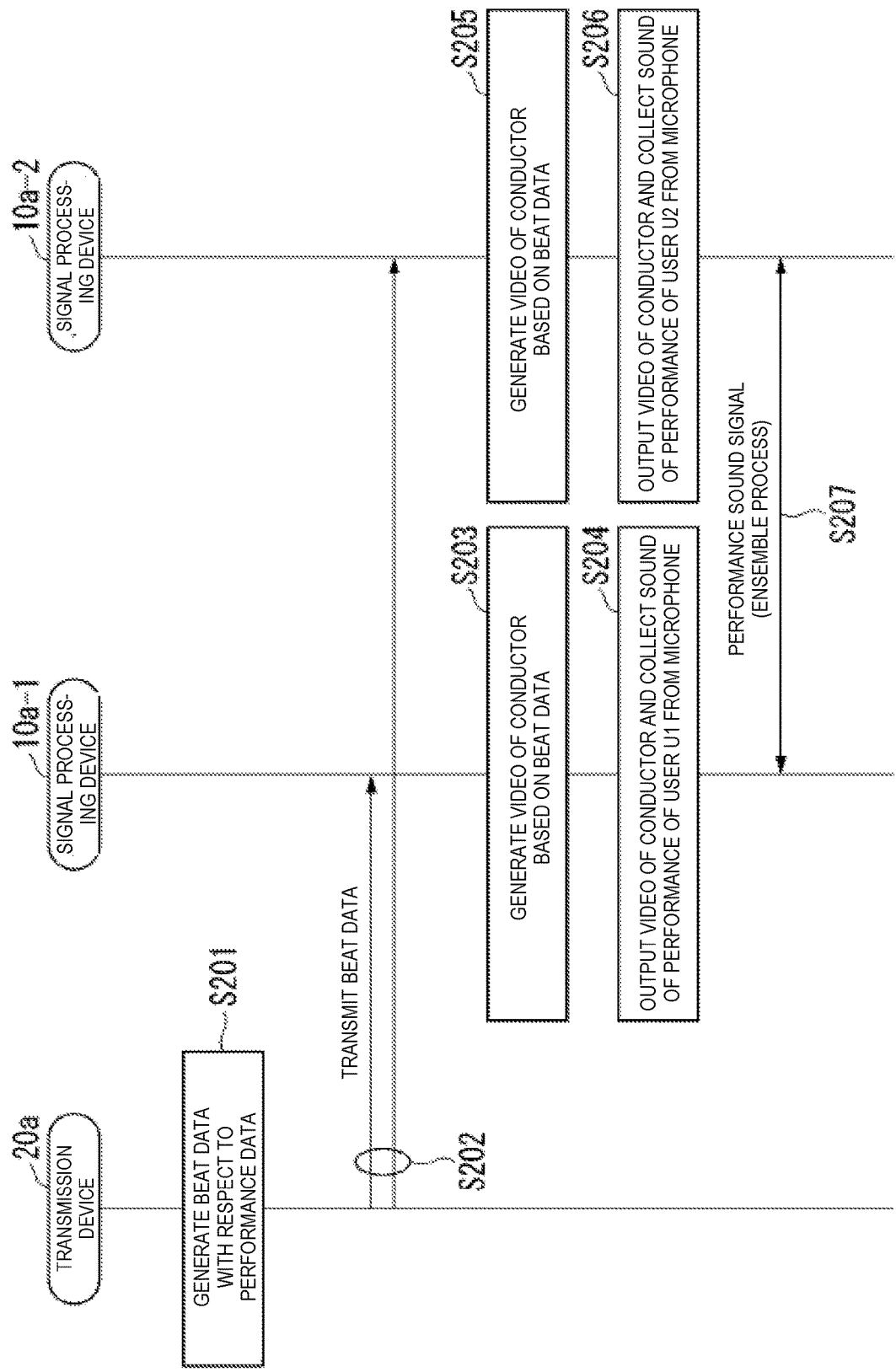
FIG. 5 is a diagram showing one example of an operation of a signal processing system according to the second embodiment.

In FIG. 5, an example of an operation will be described in which beat data transmitted from the transmission device 20a are used in order to carry out an ensemble performance among the user U1 and the user U2.

In FIG. 5, the process of Step S201 is the same as the process of Step S101 shown in FIG. 3, so that the description thereof is omitted here.

Next, the transmission device 20a transmits the beat data to each of the signal processing devices 10a (10a-1, 10a-2) (Step S202). The beat data transmission section 422 transmits the beat data to each of the signal processing devices 10a. The beat data reception section 312 of the signal processing device 10a thereby receives the beat data from the transmission device 20a and causes the beat data storage section 152 to store the received beat data.

The process of Step S203 by the signal processing device 10a-1 and the process of Step S205 by the signal processing device 10a-2 are the same as the process of Step S105 shown in FIG. 3, so that the description thereof is omitted here.

In Step S204, the signal processing device 10a-1 outputs the video of the conductor and collects, from the microphone 16, the sounds of the performance of the user U1. For example, the output processing unit 33a causes the display unit 13 to output a video signal based on video data of the conductor stored in the video data storage section 154, such as the video M1 shown in FIG. 2. Further, the ensemble processing unit 34 acquires a sound signal (performance sound signal) of the performance of the user U1 collected by the microphone 16.

Further, in Step S206, the signal processing device 10a-2 outputs the video of the conductor and collects, from the microphone 16, the sounds of the performance of the user U2. For example, the output processing unit 33a causes the display unit 13 to output a video signal based on video data of the conductor stored in the video data storage section 154, such as the video M1 shown in FIG. 2. Further, the ensemble processing unit 34 acquires performance sound signals of the user U2 collected by the microphone 16.

The signal processing device 10a-1 and the signal processing device 10a-2 then transmit their respective performance sound signals and execute the ensemble performance process (Step S207). The ensemble processing unit 34 of the signal processing device 10a-1 transmits the performance sound signal of the user U1 to the signal processing device 10a-2, receives the performance sound signal of the user U2 from the signal processing device 10a-2, and causes the speaker 14 of the signal processing device 10a-1 to output the performance sound signal of the user U2. Further, the ensemble processing unit 34 of the signal processing device 10a-2 transmits the performance sound signal of the user U2 to the signal processing device 10a-1, receives the performance sound signal of the user U1 from the signal processing device 10a-1, and causes the speaker 14 of the signal processing device 10a-2 to output the performance sound signal of the user U1.

In this manner, with the signal processing system 1a according to the present embodiment, ensemble performances among a plurality of users who are located at remote distances from each other can be performed.

As described above, the signal processing device 10a according to the present embodiment includes the reception processing unit 31a (reception unit), the video data generation unit 32 (generation unit), and the output processing unit 33a (processing unit). The reception processing unit 31a receives second time-series data (for example, beat data) that are generated based on the performance data (first time-series data) on a performance in which a predetermined musical piece has been played, and that include at least data indicating a timing of the performance. The video data generation unit 32 generates third time-series data (for example, video data of the conductor) that make the performance timings visually recognizable, based on the second time-series data (for example, beat data) received by the reception processing unit 31a. The output processing unit 33a outputs an output signal (for example, video signal) based on the third time-series data (such as video data of the conductor) such that the performance timings can be visually recognized.

As a result, in the signal processing device 10a and the signal processing system 1a according to the present embodiment, the user can appropriately perform in accordance with the desired timings. Further, with the signal processing device 10a and the signal processing system 1a according to the present embodiment, by the transmission of beat data to the plurality of signal processing devices 10a from transmission device 20a, a plurality of users in remote locations can match performance timings and carry out an ensemble performance without meeting directly, for example.

This disclosure is not limited to the embodiments described above, and can be modified within the scope of the spirit of this disclosure.

The second time-series data were described as beat data, but no particular limitation is thereby imposed. The second time-series data can be data representing positional reference information. Examples of positional reference information include the beat point time (including advance notice), times of bar boundaries, bar numbers, time signatures, rehearsal marks, movement numbers, movement names, etc. Further, besides positional reference information, the data can represent other information. Examples of other information includes standard tempo, time signature symbols, tempo change symbols, intensity, intensity changes, variation symbols, articulations, conductor facial expressions, conductor gesture information, conductor remarks, part-by-part phrase start, part-by-part phrase end, start of solo part, end of solo part, and end cues Further, the third time-series data can include sound data in addition to video data. An example of sound data is the sound of a metronome synchronized with the video of the conductor. In this case, the video data can be video of a metronome instead of video of the conductor, or video of a metronome can be displayed in addition to video of the conductor.

For example, in each of the embodiments described above, an example was described in which the signal processing system 1 (1a) is utilized for playing a musical instrument, but no limitation is thereby imposed, and, in addition to the playing of a musical instrument, the action carried out by the user can be applied to dance, gymnastics, poetry reading with background music (BGM), broadcast media, etc.

Further, in each of the embodiments described above, an example of using video data of the conductor as the third time-series data was applied, but no particular limitation is thereby imposed; for example, if the first time-series data are video data of gymnastics or dance, the third time-series data can be sound data of dialogue or signals indicating the start timings of the dance or gymnastics (e.g., shouts or signals like "Bigger!" "Slowly!") or video data of an instructor (for example, video from which expressions and gestures can be discerned).

Further, in the first embodiment described above, beat data can be transmitted to a plurality of signal processing devices 10 in order to carry out an ensemble performance, or the like, in the same manner as in the second embodiment. Further, in this case, the signal processing device 10 can be equipped with the above-mentioned ensemble processing unit 34.

Further, in the first embodiment described above, the signal processing device 10 can be configured to be capable of setting a prescribed shift width, when outputting the output signal based on the third time-series data in synchronization with the output signal based on the first time-series data. Further, the signal processing device 10 can be configured to be capable of pausing, changing the speed, etc., of the synchronized output.

Further, in each of the embodiments described above, the signal processing device 10 (10a) can be configured such that the main part is changed in the video of the conductor. In this case, the main part can be a bass instrument or a rhythm instrument.

Each component included in the signal processing system 1 (1a) described above contains a computer system. The processing steps of each component included in the above-mentioned signal processing system 1 (1a) are stored in the computer-readable storage medium in the form of a program, and the computer reads and executes this program to perform the process described above. Here, a computer-readable storage medium refers to a magnetic disk, a magnetooptical disk, a CD-ROM, a DVD-ROM, a semiconductor memory, etc. Further, the computer program can be distributed to a computer by a communication line, and the computer that has received the distribution can execute the program.

Effects

By this disclosure, the user can appropriately carry out an action in accordance with the desired timing.

What is claimed is:

1. A signal processing device configured to be connected to a remote signal processing device that is remotely located from the signal processing device via a network, the signal processing device comprising:
   an electronic controller including at least one processor, the electronic controller being configured to execute
      a reception unit configured to receive second time-series data, the second time-series data being generated based on first time-series data of a performance in which a predetermined musical piece has been played, the second time-series data including at least data indicating a timing of the performance;
      a generation unit configured to generate third time-series data, which make the timing of the performance visually recognizable, based on the second time-series data received by the reception unit;
      a processing unit configured to output an output signal based on the third time-series data such that the timing of the performance is visually recognized; and
      an ensemble processing unit
         configured to transmit a performance sound signal of performance sound, which is collected by a microphone of the signal processing device in response to the output signal, to the remote signal processing device via the network, and
         configured to receive a performance sound signal of performance sound, which is collected by a microphone of the remote signal processing device in response to the output signal, from the remote signal processing device via the network, to output the performance sound, which is collected by the microphone of the remote signal processing device in response to the output signal, from a speaker of the signal processing device.

2. The signal processing device according to claim 1, wherein
   the first time-series data are performance data,
   the timing of the performance includes an action start timing,
   the second time-series data are beat data that indicate a beat and include at least the action start timing,
   the generation unit is configured to generate video data as the third time-series data based on the beat data, and
   the processing unit is configured to output a video signal based on the video data.

3. The signal processing device according to claim 2, wherein the generation unit is configured to generate the video data of a conductor.

4. The signal processing device according to claim 3, wherein the generation unit is configured to generate the video data of the conductor based on the beat data by machine learning.

5. The signal processing device according to claim 1, wherein
   the reception unit is configured to receive the second time-series data having a smaller amount of data than the first time-series data, and
   the generation unit is configured to decode the second time-series data to generate the third time-series data.

6. The signal processing device according to claim 1, wherein
   the second time-series data include beat point data that indicate a beat of the human action, and data that indicate an intensity of the performance, and
   the generation unit is configured to generate the third time-series data that include instruction data of the intensity of the performance.

7. A signal processing system comprising:
   a transmission device including a first electronic controller that includes at least one processor, the first electronic controller being configured to execute
      a first generation unit configured to generate, based on first time-series data of a performance in which a predetermined musical piece has been played, second time-series data including at least data that indicate a timing of the performance, and
      a transmission processing unit configured to transmit the second time-series data; and
   a signal processing device configured to be connected to the transmission device and a remote signal processing device that is remotely located from the signal processing device via a network, the signal processing device including a second electronic controller that includes at least one processor, the second electronic controller being configured to execute
      a reception unit configured to receive the second time-series data from the transmission device,
      a second generation unit configured to generate, based on the second time-series data received by the reception unit, third time-series data, which make the timing of the performance visually recognizable,
      a processing unit configured to output an output signal based on the third time-series data such that the timing of the performance is visually recognized, and
      an ensemble processing unit
         configured to transmit a performance sound signal of performance sound, which is collected by a microphone of the signal processing device in response to the output signal, to the remote signal processing device via the network, and
         configured to receive a performance sound signal of performance sound, which is collected by a microphone of the remote signal processing device in response to the output signal, from the remote signal processing device via the network, to output the performance sound, which is collected by the microphone of the remote signal processing device in response to the output signal, from a speaker of the signal processing device.

8. A signal processing method comprising:
   receiving, at a reception unit of a signal processing device, second time-series data that are generated based on first time-series data of a performance in which a predetermined musical piece has been played, the second time-series data including at least data indicating a timing of the performance;
   generating, at a generation unit of the signal processing device, based on the second time-series data received by the reception unit, third time-series data, which make the timing of the performance visually recognizable;
   outputting, at a processing unit of the signal processing device, an output signal based on the third time-series data such that the timing of the performance is visually recognized;
   transmitting, at an ensemble processing unit of the signal processing device, a performance sound signal of performance sound, which is collected by a microphone of the signal processing device in response to the output signal, to a remote signal processing device via the network, the remote signal processing device being connected to the signal processing device via the network and remotely located from the signal processing device; and receiving, at the ensemble processing unit of the signal processing device, a performance sound signal of performance sound, which is collected by a microphone of the remote signal processing device in response to the output signal, from the remote signal processing device via the network, to output the performance sound, which is collected by the microphone of the remote signal processing device in response to the output signal, from a speaker of the signal processing device.

* * * * *